United States Patent
Lai et al.

(10) Patent No.: US 9,167,055 B2
(45) Date of Patent: Oct. 20, 2015

(54) METHOD AND SYSTEM OF DISPLAYING FRAME

(71) Applicant: Wistron Corporation, New Taipei (TW)

(72) Inventors: Alexander I-Chi Lai, New Taipei (TW); Tzu-Chieh Lin, New Taipei (TW); Pei-Ling Yu, New Taipei (TW)

(73) Assignee: Wistron Corporation, New Taipei (TW)

( * ) Notice: Subject to any disclaimer, the term of this patent is extended or adjusted under 35 U.S.C. 154(b) by 272 days.

(21) Appl. No.: 13/754,898

(22) Filed: Jan. 31, 2013

(65) Prior Publication Data

US 2014/0181182 A1   Jun. 26, 2014

(30) Foreign Application Priority Data

Dec. 24, 2012   (TW) .............................. 101149632 A

(51) Int. Cl.
*H04L 29/06* (2006.01)
*H04L 29/08* (2006.01)

(52) U.S. Cl.
CPC ................ *H04L 67/42* (2013.01); *H04L 67/08* (2013.01)

(58) Field of Classification Search
CPC ......... H04L 67/42; H04L 67/10; H04L 67/06; H04L 67/16
See application file for complete search history.

(56) References Cited

U.S. PATENT DOCUMENTS

| | | | |
|---|---|---|---|
| 2002/0101428 A1* | 8/2002 | Hsiao et al. | 345/539 |
| 2003/0061319 A1* | 3/2003 | Manzardo | 709/221 |
| 2004/0117458 A1* | 6/2004 | Tominaga | 709/217 |
| 2007/0274400 A1* | 11/2007 | Murai et al. | 375/240.26 |
| 2008/0159639 A1* | 7/2008 | Dvir et al. | 382/236 |

FOREIGN PATENT DOCUMENTS

| | | | |
|---|---|---|---|
| TW | 509879 | 11/2002 | |
| TW | 201123003 | * 12/2009 | ............... G06F 3/14 |
| TW | 201123003 | 7/2011 | |

OTHER PUBLICATIONS

"Office Action of Taiwan Counterpart Application", issued on Sep. 19, 2014 with partial English translation, p. 1-p. 26, in which the listed references were cited.
Microsoft Corporation, "[MS-RDPBCGR]: Remote Desktop Protocol: Basic Connectivity and Graphics Remoting," Oct. 17, 2012, pp. 21-25 and 86-87.
Microsoft Corporation, "[MS-RDPEGDI]: Remote Desktop Protocol: Graphics Device Interface (GDI) Acceleration Extensions," Oct. 17, 2012, pp. 21-23.

* cited by examiner

*Primary Examiner* — Sargon Nano
*Assistant Examiner* — Afroza Sultana
(74) *Attorney, Agent, or Firm* — Jianq Chyun IP Office

(57) ABSTRACT

A method and a system of displaying a frame are provided. The method is applicable for an electronic apparatus, and the method includes: obtaining capability information of each client apparatus in a subnet where the electronic apparatus is located, so as to obtain total capability information; connecting a server system and receiving a capability inquiring instruction from the server system; reporting the total capability information to the server system in response to the capability inquiring instruction, so that the server system sends a drawing instruction; co-generating the frame with the client apparatuses according to the drawing instruction sent by the server system.

11 Claims, 3 Drawing Sheets

METHOD AND SYSTEM OF DISPLAYING FRAME

CROSS-REFERENCE TO RELATED APPLICATION

This application claims the priority benefit of Taiwan application serial no. 101149632, filed on Dec. 24, 2012. The entirety of the above-mentioned patent application is hereby incorporated by reference herein and made a part of this specification.

BACKGROUND OF THE INVENTION

1. Field of the Invention

The invention relates to a mechanism of displaying a frame, and more particularly, to a method and a system of displaying a frame of a virtual desktop.

2. Description of Related Art

A virtual desktop infra-structure (VDI) enables a user to store and run workloads in a centralized, server-based virtual machine (VM) in a data center. At present, the VDI display mechanism may be substantially categorized into client-side rendering and host-side rendering. The host-side rendering allows display frames to be transmitted to a user's computer according to the remote desktop protocol (RDP) after the display frames of the VM are generated by the remote server. According to the mechanism of the host-side rendering, only the display frames of the VM are transmitted, and thus the system requirements for the user's computer are relatively low. By contrast, the client-side rendering allows the remote server to transmit the drawing instructions relative to the display frames of the VM to the user's computer, and the user's computer itself generates the display frames of the VM. Hence, the mechanism of the client-side rendering is conducive to the reduction of power consumption of the remote server.

Nonetheless, the mechanism of the host-side rendering leads to the increase in the computation amount of the remote server and thus results in significant power consumption; by comparison, under the mechanism of the client-side rendering, system resources of the client apparatuses are likely to be fully consumed.

SUMMARY OF THE INVENTION

The invention is directed to a method and a system of displaying a frame, such that a client apparatus together with other neighboring client apparatuses may co-generate the frame.

In an embodiment of the invention, a method of a displaying a frame is provided, and the method is applicable for an electronic apparatus. The method includes: obtaining capability information of a client apparatus in a subnet where the electronic apparatus is located, so as to obtain total capability information; connecting a server system and receiving a capability inquiring instruction from the server system; reporting the total capability information to the server system in response to the capability inquiring instruction, such that the server system sends a drawing instruction; co-generating the frame with the client apparatus according to the drawing instruction sent by the server system.

According to an embodiment of the invention, in the step of obtaining the capability information of the client apparatus to obtain the total capability information, a capability collection packet is broadcast to the client apparatus that is located in the subnet, and a capability response packet is received from the client apparatus. Here, the capability response packet includes the capability information of the client apparatus, and the total capability information is calculated according to capability information of the electronic apparatus and the capability information of the client apparatus.

According to an embodiment of the invention, in the step of co-generating the frame with the client apparatus according to the drawing instruction sent by the server system, imaging mission information is transmitted to the client apparatus after the drawing instruction is received from the server system, and the imaging mission information includes a resolution of the frame and dimensions of tiles constituting the frame. Besides, in this step, mission response information is received from the client apparatus, and the mission response information includes the number of the tiles to be completed by the client apparatus.

According to an embodiment of the invention, after the step of receiving the mission response information from the client apparatus, the method further includes: according to the received mission response information, determining a location of each tile for which the client apparatus is responsible; transmitting the drawing instruction and the location of each tile (for which the client apparatus is responsible) to the client apparatus, so as to generate the frame by the client apparatus according to the drawing instruction; receiving from the client apparatus a tile frame corresponding to the location of each tile for which the client apparatus is responsible. Here, the tile frame received from the client apparatus is obtained from the frame generated by the client apparatus.

According to an embodiment of the invention, in the step of co-generating the frame with the client apparatus according to the drawing instruction sent by the server system, drawing data is written into a back buffer after the drawing instruction is received from the server system, and the drawing data is generated according to the drawing instruction. When the tile frame is received from the client apparatus, the received tile frame is rewritten into the back buffer according to the location of each tile for which the client apparatus is responsible. After a predetermined period goes by, the drawing data in the back buffer is copied to a front buffer, so as to display contents of the front buffer.

According to an embodiment of the invention, the capability information includes at least one of or a combination of execution performance of a central processing unit (CPU), execution performance of a graphics processing unit (GPU), execution performance of a memory, a type of the drawing instruction supportable by the client apparatus, and a graphics score.

According to an embodiment of the invention, in the step of reporting the total capability information to the server system, the total capability information is reported to the server system through a remote desktop protocol (RDP).

In an embodiment of the invention, a system of displaying a frame is provided, and the system includes a server system and a plurality of client apparatuses. These client apparatuses are located in the same subnet, and each of the client apparatuses obtains capability information from each other or one another to obtain total capability information. One of the client apparatuses connected to the server system is regarded as a target client apparatus, and the other client apparatuses are regarded as neighboring client apparatuses. When the target client apparatus is connected to the server system and receives a capability inquiring instruction from the server system, the target client apparatus reports the total capability information to the server system in response to the capability inquiring instruction, such that the server system sends a drawing instruction to the target client apparatus, and the target client apparatus co-generates the frame with the neighboring client apparatuses according to the drawing instruction sent by the server system.

In view of the foregoing, the client apparatus searches for the neighboring client apparatuses to co-generate the frame; thereby, the frame can be rendered in the client apparatus, and the issue of depleting the resources of the client apparatus may be prevented.

Several exemplary embodiments accompanied with figures are described in detail below to further describe the invention in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DETAILED DESCRIPTION OF DISCLOSED EMBODIMENTS

In the conventional remote desktop display mechanism, after a server system renders a frame, the server system transmits the frame to a client apparatus, which however increases the computation amount of the server system. By contrast, if the server system transmits a drawing instruction to the client apparatus to render the frame through the client apparatus, the resources of the client apparatus are apt to be fully consumed, given that the processing capability of the client apparatus is not sufficient. Accordingly, the invention is directed to a method and a system of displaying a frame, such that the frame may be rendered in the client apparatus, and the issue of depleting the resources of the client apparatus may be prevented. In order to make the invention more comprehensible, embodiments are described below as the examples to prove that the invention can actually be realized.

Figure 1:
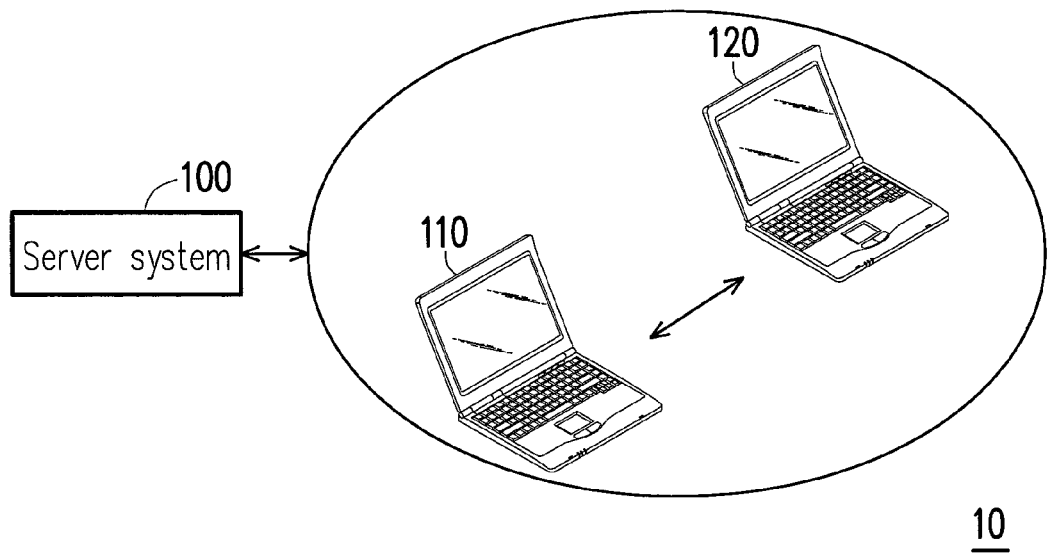
FIG. 1 is a schematic view illustrating a system of displaying a frame according to an embodiment of the invention.

FIG. 1 is a schematic view illustrating a system of displaying a frame according to an embodiment of the invention. With reference to FIG. 1, a system 10 of displaying a frame is provided, and the system 10 includes a server system 100 and a plurality of client apparatuses 110 and 120. Here, only the client apparatuses 110 and 120 are depicted in the drawings, while the number of the client apparatus may be greater than or equal to three in other embodiments, which should not be construed as a limitation to the invention.

The server system 100 is, for instance, equipped with powerful computation capabilities and constituted by one or plural physical hosts. Besides, the server system 100 may include plural virtual machines (VM) to be used by the client apparatuses 110 and 120.

The client apparatuses 110 and 120 are located in the same subnet. Here, the client apparatuses 110 and 120 are electronic apparatuses or thin client apparatuses with a display unit, respectively, such as notebook computers, desktop computers, tablet PCs, smart phones, etc. According to the present embodiment, each of the client apparatuses 110 and 120 has basic components including a processing unit, a storage unit, a network unit, and so on. For instance, programming code snippets for displaying a frame are stored in the storage unit, such that the processing unit is able to perform steps of displaying the frame by executing the stored programming code snippets.

The programming code snippets for displaying the frame may be exemplarily packaged to an application program that is respectively installed into the client apparatuses 110 and 120; thereby, the client apparatuses 110 and 120 may reciprocally perform a processing function on each other.

That is, the client apparatuses 110 and 120 obtain capability information from each other, so as to obtain total capability information. Here, the capability information includes at least one of or a combination of execution performance of a central processing unit (CPU), execution performance of a graphics processing unit (GPU), execution performance of a memory, a type of the drawing instruction supportable by the client apparatus, and a graphics score. The graphics score serves to represent the performance level of a display card.

The total capability information respectively obtained by the client apparatuses 110 and 120 may be the same or different. For instance, the performance of the client apparatus 110 may be different from the performance of the client apparatus 120, and the performances supported from the client apparatuses 110 and 120 to each other may also be different. Accordingly, the total capability information respectively obtained by the client apparatuses 110 and 120 may be different from each other.

Since the action performed by the client apparatus 110 is substantially the same as the action performed by the client apparatus 120, only the client apparatus 110 is exemplarily described hereinafter for further explanation.

Before the client apparatus 110 is connected to the server system 100 (or while the client apparatus 110 is being connected to the server system 100), the client apparatus 110 may obtain the capability information that can be provided by the client apparatus 120 and add the capability information of the client apparatus 120 to the capability information owned by the client apparatus 110 itself, so as to obtain the total capability information. Thereby, when the client apparatus 110 is connected to the server system 100 and receives a capability inquiring instruction from the server system 100, the client apparatus 110 reports the total capability information to the server system 100.

The server system 100, after receiving the total capability information in response to the capability inquiring instruction sent by the server system 100, determines to enable the client-side rendering or the host-side rendering according to the total capability information. Here, when the client-side rendering is enabled, the drawing instruction is transmitted to the client apparatus 110 (or other client apparatuses connected to the server system 110), such that the client apparatus 110 generates the frame according to the drawing instruction. By contrast, when the host-side rendering is enabled, the server system 100 generates the frame and then transmits the frame to the client apparatus (or other client apparatuses connected to the server system 110).

The server system 100 makes said determination according to the received total capability information which contains the capability information of plural client apparatuses in the same subnet. Thereby, the server system 100 is convinced that the performance of the client apparatus 110 is sufficient to enable the client-side rendering, and the server system 100 accordingly transmits the drawing instruction to the client apparatus 110. Thereby, the client apparatus 110 co-generates the frame with the neighboring client apparatus 120 according to the drawing instruction sent by the server system 100.

Figure 2:
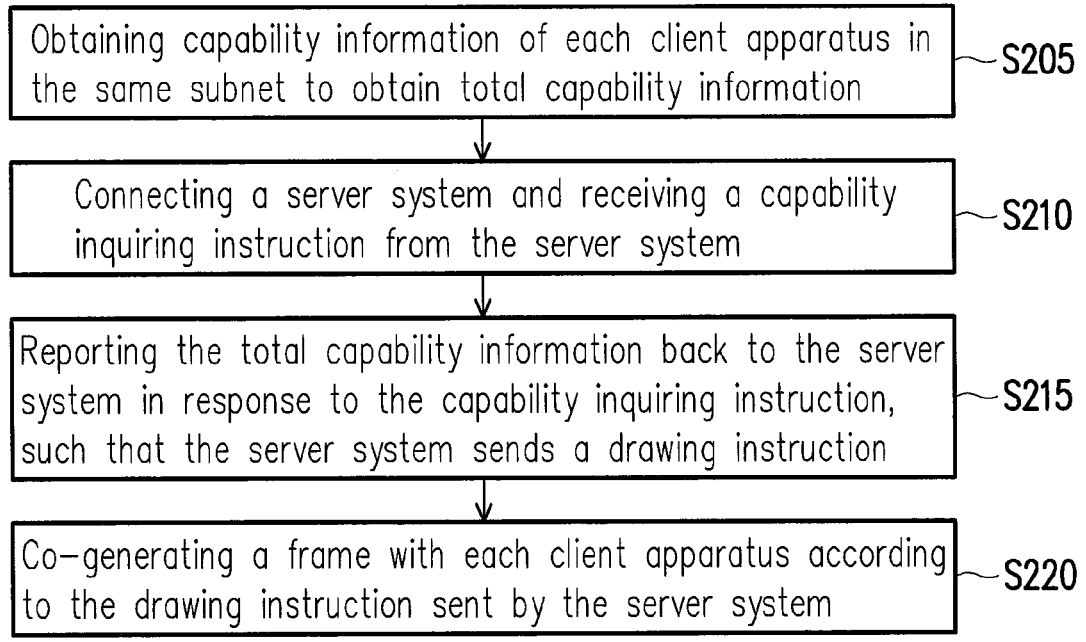
FIG. 2 is a flowchart illustrating a method of displaying a frame according to an embodiment of the invention.

Steps of displaying the frame are described below with reference to the aforementioned frame-displaying system 100. FIG. 2 is a flowchart illustrating a method of displaying a frame according to an embodiment of the invention. In the present embodiment, one of the client apparatuses 110 and 120 to be connected to the server system 100 serves as the target client apparatus to be connected to the server system 100, while the other client apparatuses serve as neighboring client apparatuses for supporting the target client apparatus.

For the illustrative purpose, the client apparatus 110 serves as the target client apparatus, and the client apparatus 120 serves as the neighboring client apparatus. Similarly, in another embodiment of the invention, the client apparatus 120 may also serve as the target client apparatus connected to the server system 100, and the steps of displaying the frame performed by the client apparatus 120 are the same as those performed by the client apparatus 110; therefore, relevant descriptions are omitted hereinafter.

With reference to FIG. 1 and FIG. 2, in step S205, the client apparatus 110 and the client apparatus 120 are located in the same subnet, and the client apparatus 110 obtains capability information from the client apparatus 120, so as to obtain total capability information. For instance, the client apparatus 110 may broadcast a capability collection packet to the client apparatus 120 located in the same subnet. When the client apparatus 120 receives the capability collection packet, the client apparatus 120 may transmit capability information to the client apparatus 110 through transmitting a capability response packet (i.e., the capability response packet includes the capability information of the client apparatus 120). Here, the capability information may be predetermined capability information or may be provided according to the settings by a user of the client apparatus 120. When the client apparatus 110 receives the capability response packet from the client apparatus 120, the client apparatus 110 calculates the total capability information according to its capability information and the received capability information.

When a user intends to use a remote virtual desktop through the client apparatus 110, in step S210, the client apparatus 110 is connected to the server system 100 and receives a capability inquiring instruction from the server system 100. That is, if the server system 100 detects that the client apparatus 110 is connected to the server system 100, the server system 100 transmits the capability inquiring instruction to the client apparatus 110.

In step S215, the client apparatus 110 reports the total capability information back to the server system 100 in response to the capability inquiring instruction, such that the server system 100 sends a drawing instruction. The drawing instruction includes at least one of or a combination of a graphics device interface (GDI) instruction, a DirectX interface instruction, an open graphics library (OpenGL) instruction. In the following step S220, the client apparatus 110 co-generates the frame with the client apparatus 120 according to the drawing instruction sent by the server system 100. That is, after the client apparatus 110 receives the drawing instruction, the client apparatus 110 searches for the neighboring client apparatus 120 to assist in generating the frame.

The total capability information contains the capability information of plural client apparatuses in the same subnet; hence, the server system 100 is convinced that the performance of the client apparatus 110 is sufficient to enable the client-side rendering, and the server system 100 accordingly transmits the drawing instruction to the client apparatus 110. For instance, according to a remote desktop protocol (RDP), given that the client apparatus 110 does not support the GDI+ 1.1 version which however may be supported by the client apparatus 120, the value corresponding to a parameter "drawGdiplusCacheLevel" of the total capability information becomes "0x00000001" because the total capability information transmitted by the client apparatus 110 includes the capability information of the client apparatus 120. Said embodiment may be implemented without modifying the initial communication protocol.

Another embodiment is provided below to describe steps of co-generating the frame by the target client apparatus and the neighboring client apparatuses.

Figure 3:
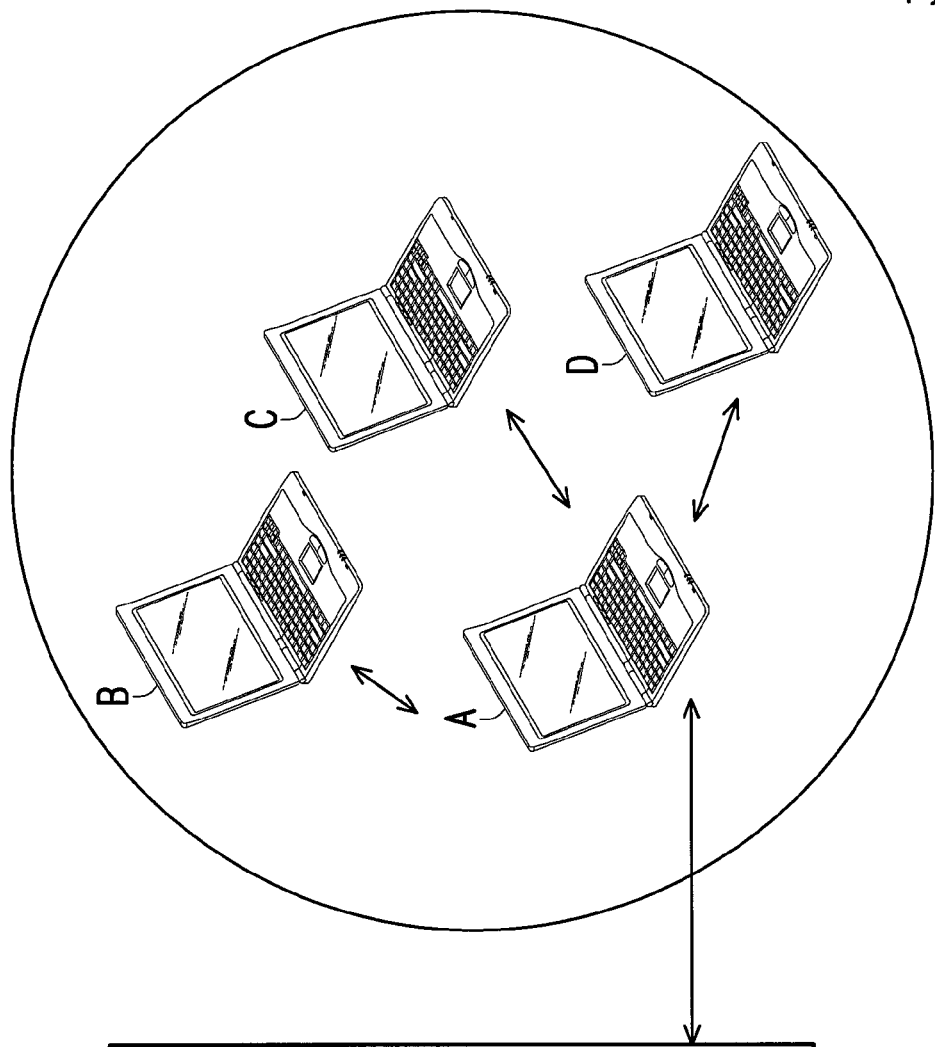
FIG. 3 is a schematic view illustrating a system of displaying a frame according to another embodiment of the invention.
Figure 3:
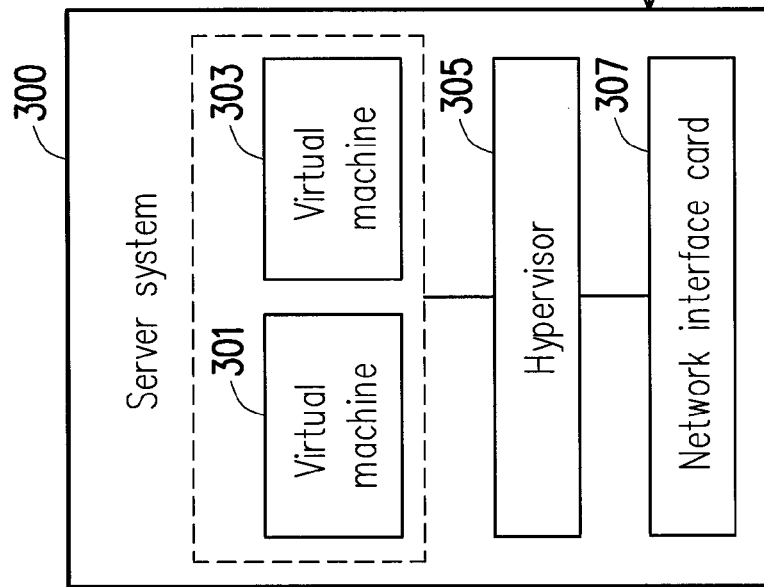

FIG. 3 is a schematic view illustrating a system of displaying a frame according to another embodiment of the invention. With reference to FIG. 3, a system 30 of displaying a frame is provided, and the system 30 includes a server system 300 and a plurality of client apparatuses A, B, C, and D which are located in the same subnet. The number of the client apparatuses in the same subnet is not limited in the present embodiment.

The server system 300 includes a plurality of virtual machines (VMs) 301 and 303 as well as a hypervisor 305. Here, two VMs 301 and 303 are depicted in the drawings, while the invention should not be construed as limited to the embodiment set forth herein. The hypervisor 305, also referred to as a virtual machine monitor (VMN), is an intermediate software layer running between a physical host and an operating system. In addition, the server system 300 communicates with the client apparatuses A, B, C, and D through the network interface card 307. The network interface card 307 is a physical network card.

According to the present embodiment, the server system 300 has a virtual desktop infra-structure (VDI), for instance, and the VDI is able to manage and execute the desktop workloads (e.g., an operating system, an application program, user's data, etc.) at the user's end (e.g., the workloads of the client apparatuses A, B, C, and D) on the server system 300. Through a user-end apparatus (e.g., the client apparatuses A, B, C, and D) that can support the RDP, the user is able to communicate with the virtual desktop.

Steps of co-generating the frame are described below with reference to the aforementioned frame-displaying system 30. The client apparatuses A, B, C, and D obtain capability information from each other, such that each of the client apparatuses A, B, C, and D obtains individual total capability information. For instance, the client apparatus A obtains the capability information of the client apparatuses B, C, and D; the client apparatus B obtains the capability information of the client apparatuses A, C, and D; the client apparatus C obtains the capability information of the client apparatuses A, B, and D; the client apparatus D obtains the capability information of the client apparatuses A, B, and C.

For the illustrative purpose, the client apparatus A serves as the target client apparatus, and the client apparatuses B, C, and D serve as the neighboring client apparatuses. The process during which the client apparatus A obtains the total capability information and receives the drawing instruction from the server system 300 is the same as those described in the previous steps S205 to S215 and therefore will not be further elaborated hereinafter.

Figures 4, 5:
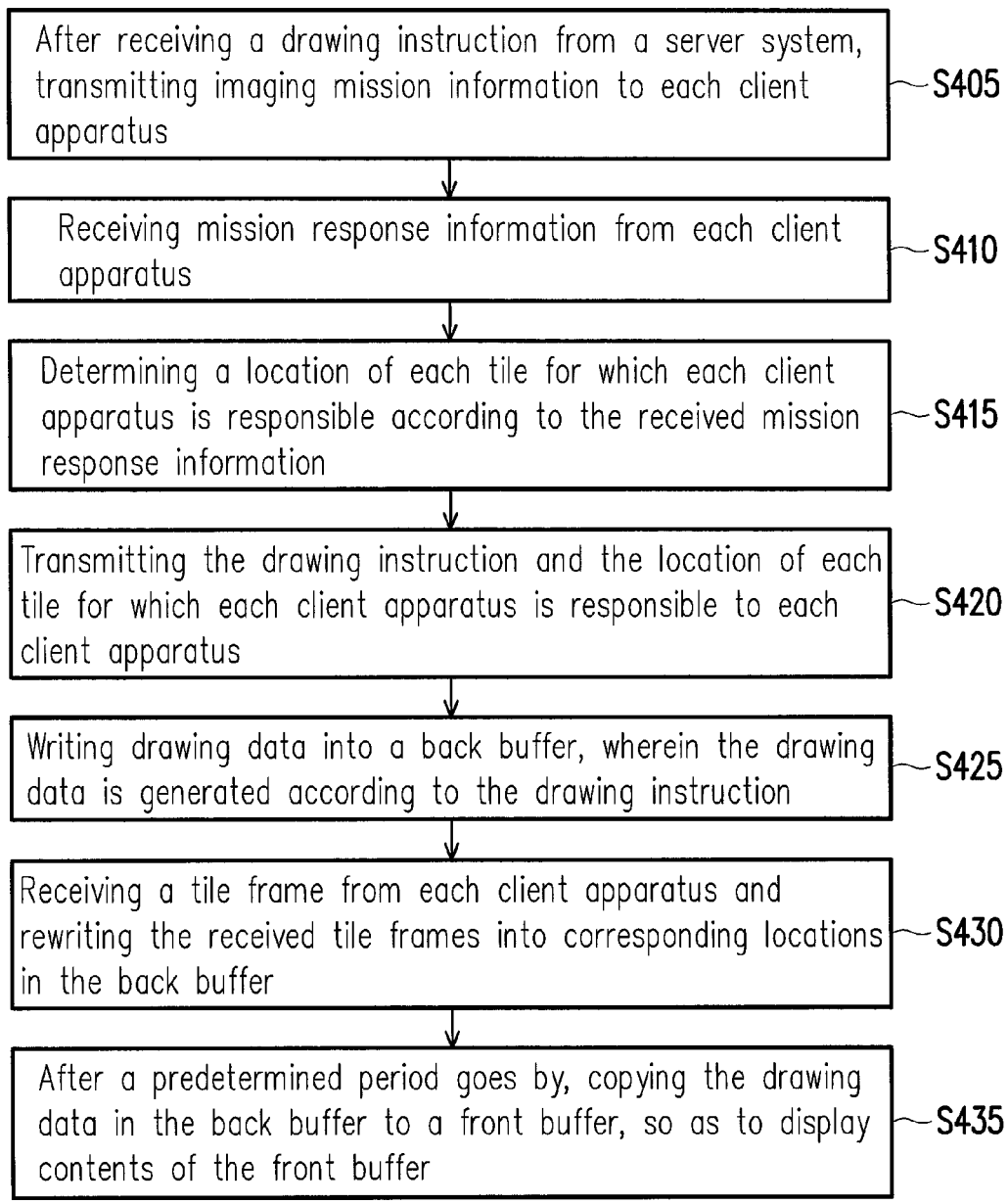
FIG. 4 is a flowchart illustrating a method of co-generating a frame according to an embodiment of the invention.
FIG. 5 is a schematic view illustrating a location of each tile for which each client apparatus is responsible according to an embodiment of the invention.

FIG. 4 is a flowchart illustrating a method of co-generating a frame according to an embodiment of the invention. With reference to FIG. 3 and FIG. 4, in step S405, after the client apparatus A receives the drawing instruction from the server system 300, the client apparatus A transmits imaging mission information to the neighboring client apparatuses B, C, and D in the same subnet. The imaging mission information includes a resolution of the frame to be generated and dimensions of tiles constituting the frame. For instance, the resolution of the frame is 1024×768; the frame is about to be divided into 16 tiles; the dimension of each tile is 256×192.

In step S410, the client apparatus A receives mission response information from each of the client apparatuses B, C, and D, respectively. The mission response information respectively transmitted by the client apparatuses B, C, and D includes the number of the tiles to be completed by each of the client apparatuses B, C, and D. That is, when each of the client apparatuses B, C, and D receives the imaging mission information, the client apparatuses B, C, and D respectively determine the number of tiles for which the client apparatuses B, C, and D may be individually responsible according to the capability information of the client apparatuses B, C, and D, and each of the client apparatuses B, C, and D then transmits the mission response information to the client apparatus A. For instance, the mission response information transmitted by the client apparatus B indicates that the client apparatus B is able to be responsible for two tiles; the mission response information transmitted by the client apparatus C indicates that the client apparatus C is able to be responsible for four tiles; the mission response information transmitted by the client apparatus D indicates that the client apparatus D is able to be responsible for six tiles.

According to the mission response information received from each of the client apparatuses B, C, and D, the client apparatus A in step S415 determines a location of each tile for which each of the client apparatuses B, C, and D is responsible. FIG. 5 is a schematic view illustrating a location of each tile for which each client apparatus is responsible according to an embodiment of the invention. As shown in FIG. 5, the client apparatus A is responsible for tiles A1 to A4, the client apparatus B is responsible for tiles B1 and B2, the client apparatus C is responsible for tiles C1 to C4, and the client apparatus D is responsible for tiles D1 to D6.

After the location of each tile are determined, in step S420, the client apparatus A transmits the drawing instruction and the location of each tile for which each of the client apparatuses B, C, and D is responsible to each of the client apparatuses B, C, and D, such that the client apparatuses B, C, and D generate the frame according to the drawing instruction.

Besides, after the client apparatus A receives the drawing instruction from the server system 300, in step S425, the client apparatus A writes drawing data into a back buffer, wherein the drawing data is generated according to the drawing instruction. In step S430, the client apparatus A receives one or more tile frames from the client apparatuses B, C, and D, respectively, and the client apparatus A rewrites the received tile frames into corresponding locations in the back buffer.

Namely, the client apparatus A continually receives the tile frame corresponding to the location of each tile for which each of the client apparatuses A, B, and C is responsible. Specifically, after the client apparatuses B, C, and D receive the drawing instruction and generate the entire frame, the client apparatuses B, C, and D sent the tile frame (corresponding to the location of the tile for which each of the client apparatuses A, B, and C is responsible) to the client apparatus A. When the client apparatus A receives the tile frames, the client apparatus A rewrites the received tile frames into the back buffer according to the locations of the tiles for which the client apparatuses B, C, and D are responsible.

In step S435, after a predetermined period goes by, the client apparatus A copies the drawing data in the back buffer to the front buffer, so as to display contents of the front buffer. In another embodiment of the invention, the client apparatus exchanges the back buffer and the front buffer after a predetermined period goes by.

Particularly, in the present embodiment, the client apparatus A includes two buffers, i.e., the front buffer and the back buffer, so as to generate the frame to be used. In other embodiments of the invention, the number of the buffers is not limited. The client apparatus A writes the drawing data (generated in the drawing process) into the back buffer. When the client apparatus A continually receives the tile frames, the client apparatus A rewrites the received tile frames into the corresponding locations of the back buffer, regardless of whether any drawing data is already written into the corresponding locations of the back cover. After a predetermined period (e.g., five seconds) goes by, the client apparatus A copies the drawing data in the back buffer to the front buffer, so as to display contents of the front buffer. Thereby, the user of the client apparatus A is able to see the resultant frame.

After the client apparatus A receives the drawing instruction from the server system 300, the step S425 may be performed, i.e., the client apparatus A generates the frame according to the drawing instruction. The step S425 not only can be performed after the step S420 but also can be performed together with the step S420 or before the step S420.

To sum up, in the previous embodiments, the total capability information contains the capability information of plural client apparatuses in the same subnet; hence, the server system is more likely to determine that the performance of the client apparatus is sufficient to enable the client-side rendering. Therefore, the server system may no longer negate the client-side rendering only because one single client apparatus has insufficient performance. In addition, due to the assistance from plural client apparatuses, the issue of the insufficient performance of one single client apparatus may be resolved. As a result, the frame may be generated in the client apparatus, and the problem of depleting the resources of the client apparatus may be prevented. From another perspective, the transmission of the drawing instruction does not consume the bandwidth as much as the transmission of the entire frame does, and thus the speed of transmitting the drawing instruction is faster than that of transmitting the entire frame. Moreover, the workload of the server system is reduced, and so is the power consumption of the server system.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. A method of displaying a frame, for an electronic apparatus, and the method comprising:
    obtaining, by the electronic apparatus, capability information of a client apparatus in a subnet where the electronic apparatus is located, wherein the capability information of the client apparatus is utilized to support the electronic apparatus to render a frame;
    calculating, by the electronic apparatus, total capability information according to the capability information of the electronic apparatus and the capability information of the client apparatus;
    connecting, by the electronic apparatus, a server system and receiving a capability inquiring instruction from the server system;

reporting, by the electronic apparatus, the total capability information to the server system in response to the capability inquiring instruction, such that the server system sends a drawing instruction to the electronic apparatus; and co-generating, by the electronic apparatus, the same frame with the client apparatus according to the drawing instruction sent by the server system, comprising:

transmitting, by the electronic apparatus, imaging mission information to the client apparatus after receiving the drawing instruction from the server system, the imaging mission information comprising a resolution of the frame and dimensions of tiles constituting the frame;

receiving, by the electronic apparatus, mission response information from the client apparatus, wherein the mission response information comprises the number of the tiles to be completed by the client apparatus according to the received mission response information, determining, by the electronic apparatus, a location of each tile for which the client apparatus is responsible;

transmitting, by the electronic apparatus, the drawing instruction and the location of each tile for which the client apparatus is responsible to the client apparatus, so as to generate the frame by the client apparatus according to the drawing instruction; and receiving, by the electronic apparatus, from the client apparatus a tile frame corresponding to the location of each tile for which the client apparatus is responsible, wherein the tile frame received from the client apparatus is obtained from the frame generated by the client apparatus.

2. The method as recited in claim 1, wherein before the step of calculating, by the electronic apparatus, the total capability information according to the capability information of the electronic apparatus and the capability information of the client apparatus, the method further comprises:

broadcasting, by the electronic apparatus, a capability collection packet to the client apparatus in the subnet; and receiving, by the electronic apparatus, a capability response packet from the client apparatus, wherein the capability response packet comprises the capability information of the client apparatus, wherein the capability information is utilized to support the electronic apparatus to render the frame.

3. The method as recited in claim 1, wherein the step of co-generating, by the electronic apparatus, the same frame with the client apparatus according to the drawing instruction sent by the server system further comprises:

after receiving, by the electronic apparatus, the drawing instruction from the server system, writing drawing data into a back buffer, wherein the drawing data is generated according to the drawing instruction;

when receiving, by the electronic apparatus, the tile frame from the client apparatus, rewriting the received tile frame into the back buffer according to the location of each tile for which the client apparatus is responsible; and copying, by the electronic apparatus, the drawing data in the back buffer to a front buffer after a predetermined period goes by, so as to display contents of the front buffer.

4. The method as recited in claim 1, wherein the capability information comprises at least one of or a combination of execution performance of a central processing unit, execution performance of a graphics processing unit, execution performance of a memory, a type of the drawing instruction supportable by the client apparatus, and a graphics score.

5. The method as recited in claim 1, wherein the step of reporting, by the electronic apparatus, the total capability information to the server system comprises:

reporting, by the electronic apparatus, the total capability information to the server system through a remote desktop protocol.

6. A system of displaying a frame, comprising:

a server system; and a plurality of client apparatuses located in a subnet, each of the client apparatuses obtaining capability information, is utilized to support each of the other client apparatuses from each other or one another to render a frame, to calculate obtain total capability information according to the capability information of each client apparatus itself and the capability information of each of the other client apparatuses, wherein one of the client apparatuses connected to the server system is regarded as a target client apparatus, and the other client apparatuses are regarded as neighboring client apparatuses, wherein when the target client apparatus is connected to the server system and receives a capability inquiring instruction from the server system, the target client apparatus reports the total capability information to the server system in response to the capability inquiring instruction, such that the server system sends a drawing instruction to the target client apparatus, and the target client apparatus co-generates the same frame with the neighboring client apparatuses according to the drawing instruction sent by the server system wherein after the target client apparatus receives the drawing instruction from the server system, the target client apparatus transmits imaging mission information to the neighboring client apparatuses and receives mission response information from each of the neighboring client apparatuses, respectively, the imaging mission information includes a resolution of the frame and dimensions of tiles constituting the frame, and the mission response information is received from the client apparatus, and the mission response information includes the number of the tiles to be completed by each of the neighboring client apparatuses;

wherein the target client apparatus determines a location of each tile for which each of the neighboring client apparatuses is responsible according to the mission response information received from each of the neighboring client apparatuses;

transmits the drawing instruction and the location of each tile for which each of the neighboring client apparatuses is responsible to each of the neighboring client apparatuses, such that each of the neighboring client apparatuses generates the frame according to the drawing instruction; and receives from each of the neighboring client apparatuses a tile frame corresponding to the location of each tile for which each of the neighboring client apparatuses is responsible, wherein the tile frame received from each of the neighboring client apparatuses is obtained from the frame generated by each of the neighboring client apparatuses.

7. The system as recited in claim 6, wherein the server system comprises a plurality of virtual machines, when the target client apparatus is connected to one of the virtual machines, the server system transmits the capability inquiring instruction to the target client apparatus, and when the total capability information is received from the target client apparatus and a client-side rendering is determined to be performed, the server system transmits the drawing instruction to the target client apparatus.

8. The system as recited in claim 6, wherein each of the client apparatuses broadcasts a capability collection packet to the other client apparatuses located in the subnet, so as to collect the capability information of the other client apparatuses in the subset, and each of the client apparatuses further calculates the total capability information according to the capability information of each client apparatus itself and the capability information of the other client apparatuses.

9. The system as recited in claim 6, wherein the target client apparatus comprises a front buffer and a back buffer,
the target client apparatus writes drawing data into the back buffer after receiving the drawing instruction from the server system, wherein the drawing data is generated according to the drawing instruction;
wherein when the tile frame is received from each of the neighboring client apparatuses, the target client apparatus rewrites the received tile frames into the back buffer according to the location of each tile for which each of the neighboring client apparatuses is responsible, and
the target client apparatus copies the drawing data in the back buffer to the front buffer after a predetermined period goes by, so as to display contents of the front buffer.

10. The system as recited in claim 6, wherein the capability information comprises at least one of or a combination of execution performance of a central processing unit, execution performance of a graphics processing unit, execution performance of a memory, a type of the drawing instruction supportable by the client apparatus, and a graphics score.

11. The system as recited in claim 6, wherein the target client apparatus reports the total capability information to the server system through a remote desktop protocol.

* * * * *